Dec. 6, 1949 K. L. THOMPSON 2,490,490
VINEYARD PLOW
Filed Oct. 28, 1946 2 Sheets-Sheet 1
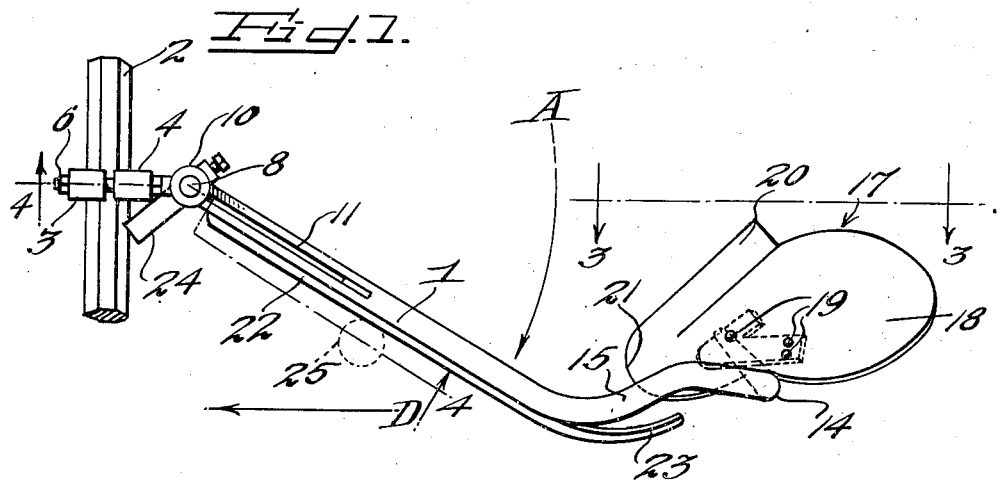
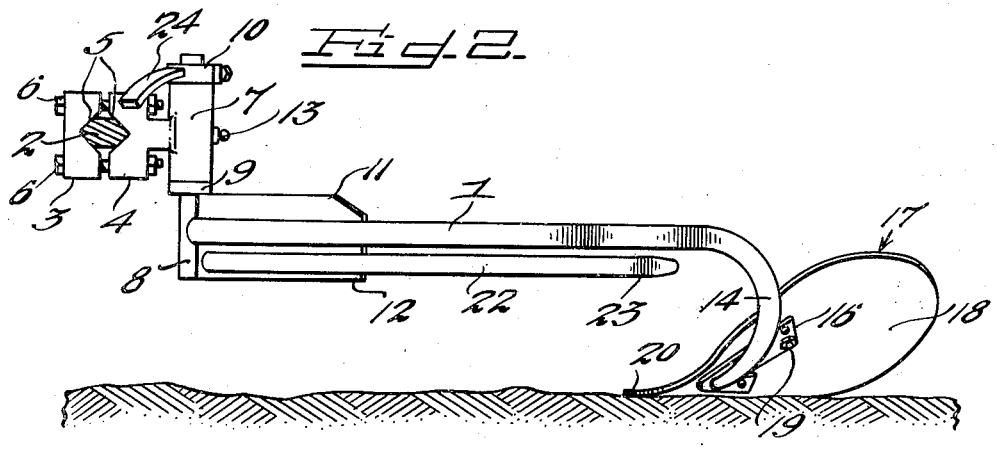
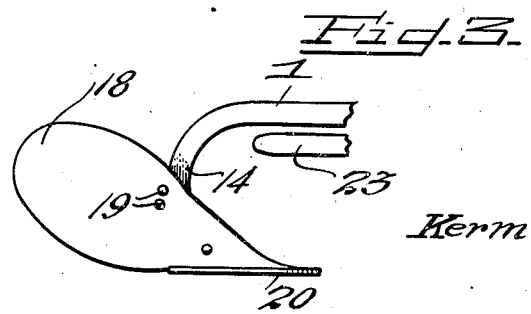
Inventor
Kermit L. Thompson.
By Clarence A. O'Brien
and Harvey B. Jacobson
Attorneys Dec. 6, 1949 — K. L. THOMPSON — 2,490,490
VINEYARD PLOW
Filed Oct. 28, 1946 — 2 Sheets-Sheet 2
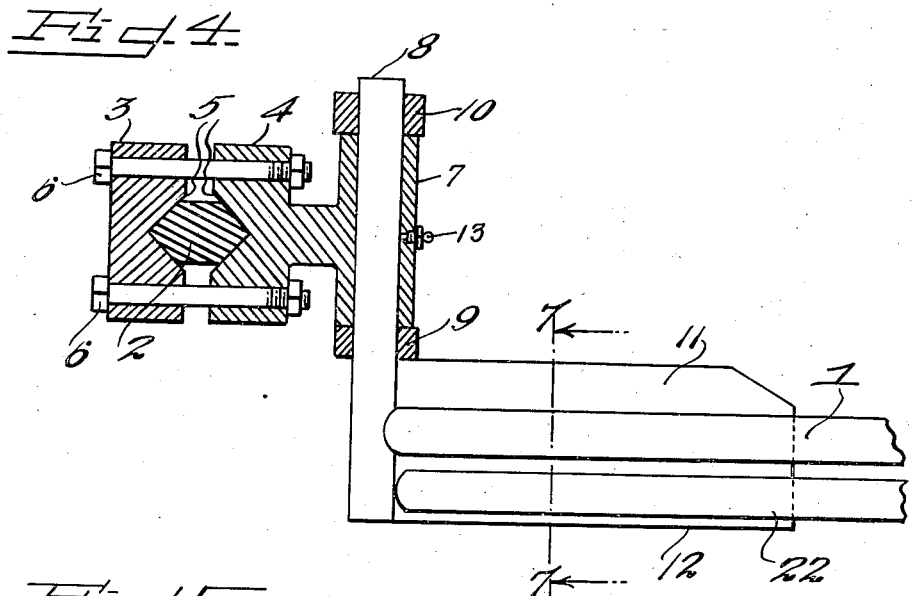
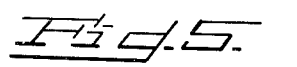
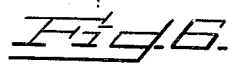
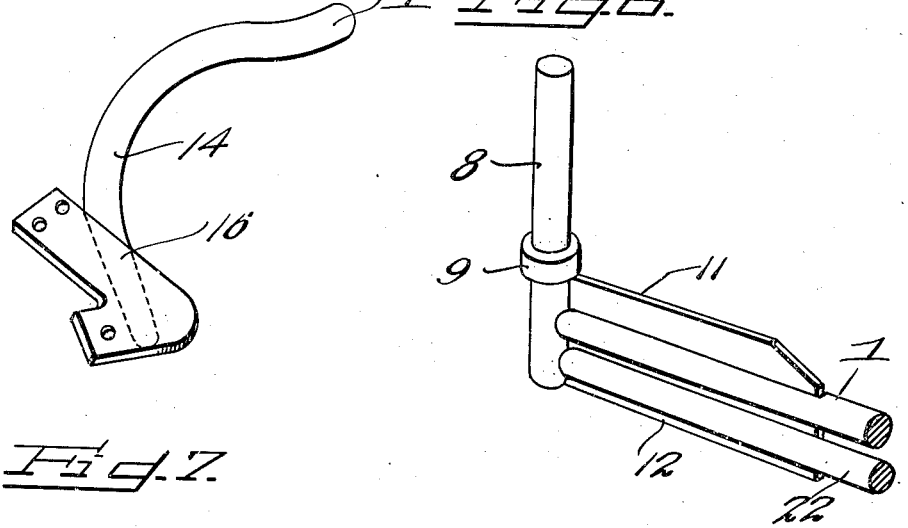
Inventor
Kermit L. Thompson
By Clarence A. O'Brien
and Harvey B. Jacobson
Attorneys

Patented Dec. 6, 1949

2,490,490

UNITED STATES PATENT OFFICE 2,490,490

VINEYARD PLOW

Kermit L. Thompson, Kingsburg, Calif.

Application October 28, 1946, Serial No. 706,136

1 Claim. (Cl. 97—137)

My invention relates to improvements in vineyard plows for plowing along rows of vines to eradicate weeds by cutting the same off below the surface of the ground.

The primary object of my invention is to provide an efficient, simply constructed and inexpensive plow of the type above indicated which is adapted for attachment to the usual implement bar of a tractor to swing laterally in and out between vines of a row to plow around the vines without injuring the same, and which is adapted to be adjusted for weeding at different depths, by vertical adjustment of the implement bar, through the usual power lift mechanism of the tractor, and is also adapted to be set for varying the arc in which it may swing according to operating requirements.

Other and subordinate objects, also comprehended by my invention, together with the precise nature of my improvements, and the advantages thereof will be readily understood when the succeeding description and claims are read with reference to the drawings accompanying and forming a part of this specification.

In said drawings:

Figure 1 is a view in plan of my improved vineyard plow attached to the implement bar of a tractor.

Figure 2 is a view in side elevation, looking at the outboard side of the plow, with the implement bar shown in transverse section.

Figure 3 is a fragmentary view in side elevation looking at the inboard side of the plow.

Figure 4 is a fragmentary view partly in transverse section and partly in side elevation taken on the line 4—4 of Figure 1 and drawn to a larger scale.

Figure 5 is a fragmentary view in perspective illustrating the bracket for mounting the plow unit on the plow beam.

Figure 6 is a fragmentary view in perspective of the spindle, plow beam, fender bar and the reinforcing ribs for said beam.

Figure 7 is a view in transverse section taken on the line 7—7 of Figure 4.

Referring to the drawings by numerals, my improved vineyard plow, in the preferred illustrated embodiment thereof, comprises a plow beam 1 of round metal stock, and which will presently be further described in detail.

At the front end of the plow beam 1 means are provided for attaching the same to the usual transverse implement bar 2 of a tractor in which said implement bar is vertically swingable into different positions by power lift mechanism of the tractor. Such power lift mechanisms of tractors being well known in the art, it has not been deemed necessary to illustrate the same. The beam-attaching means comprises the following:

A pair of complemental front and rear clamping blocks 3, 4, with V-notches 5 therein, are provided for engagement with opposite sides of the implement bar 2 when fastened together in clamping relation to said bar, by bolts 6, with said bar entered in the notches 5. The rear clamping block 4 carries a vertical bearing sleeve 7 in which a vertical spindle 8 on the front end of the plow beam 1 is journaled for lateral swinging of said beam 1 below the bearing sleeve 7 about a vertical axis. A collar 9 fixed on the spindle 8 below the sleeve 7 prevents upward thrust of the spindle 8 in the bearing sleeve 7. A set collar 10 on the upper end of the spindle 8 retains said spindle in said sleeve bearing. Below the collar 9, and the plow beam 1, a pair of upper and lower reinforcing ribs 11, 12 extend from the spindle 8 along the plow beam 1 for a short distance for reinforcing purposes. A grease gun fitting 13 on the bearing sleeve 7 provides for lubricating the spindle 8.

As will be clear, the described beam attaching means provides for lateral free swinging movement of the plow beam 1, in the direction indicated by the arrow A in Figure 1, toward a row of vines, not shown, as the beam is pulled forwardly by the implement bar 2 in the direction indicated by the arrow D, and with one side of said beam facing the row of vines and hereinafter termed the outboard side of the beam. Also, as will be seen, said means provides for freeswinging of the plow beam 1 in the opposite direction away from the row of vines.

The plow beam 1 terminates in a rear end shank 14 curving downwardly and forwardly and extending obliquely of the line of travel of said beam. The shank 14 is offset laterally on the inboard side of the plow beam 1 by a laterally curved section 15 of said beam.

A V-shaped bracket 16, suitably fixed on the shank 14, as by welding, not shown, and oblique crosswise of the line of travel of the plow beam, and also to the vertical, carries a plow unit 17.

The plow unit 17 comprises a mold board 18 bolted, as at 19, to said bracket 16, and which curves upwardly and rearwardly and slants rearwardly from the inboard side of the plow beam, as shown in Figure 1. The mold board 18 is equipped with a share 20 slanting rearwardly from a rounded leading end 21 and adapted to enter the ground in substantially horizontal position. The plow unit 17, as best shown in Figure 1, is offset laterally from the plow beam 1 on the inboard side of said beam, by the section 15 and the shank 14.

A fender bar 22, suitably fixed, as by welding, not shown, to the lower reinforcing rib 12, extends along and below the plow beam 1 on the outboard side thereof, parallel therewith, to the curved section 15 with a terminal rear end 33 terminating short of the shank 14 and curving toward the inboard side of said beam 1 in spaced relation to the shank 14 and the plow unit 17. The rear end 23 of said fender bar 22 terminates substantially laterally opposite the point 21 of the plow share 20.

A stop arm 24 on the set collar 10 is adapted to engage one side of the rear clamping block 4 to limit swinging of the plow beam 1 and the plow unit 17, in an outboard direction and is adapted to be set by said collar to variably limit such swinging of said beam and unit as may be found desirable.

Referring now to the operation of the described invention. As the plow beam 1 is pulled forwardly, in the direction of the arrow B, by the implement bar 2, which may be lowered by the power lift mechanism, not shown, of the tractor, to cause the plow unit 17 to dig into the ground at the desired depth, the plow share 20 will enter the ground and, because of the described inclination thereof, the plow unit 17 will be caused, by resistance of the ground to forward travel thereof, to move in the ground in an outboard direction in between two adjacent vines, not shown, of a row until the fender bar 22 strikes the foremost vine indicated by dotted lines at 25 in Figure 1. At this point, the fender bar is wipingly engaged with the vine and is thereby cammed in an inboard direction away from the row of vines, causing the plow beam 1 and the plow unit 17 to swing or move in an inboard direction away from the vines. As the fender bar 22, at the terminal end 20 thereof, slides past the vine 25, the plow unit 17 again moves in an outboard direction in between two adjacent vines, as will be clear. Thus, the plow unit 17 is caused to plow in an arc around each vine on one side of the row and in between the vines successively, cutting down the weeds in its path of action. Since the fender bar 22 terminates short of the shank 14 and the plow unit 17 is offset on the inboard side of the plow beam 1, when the fender bar 22, at the terminal end 23 thereof, wipes past a vine, the plow beam 1 at its rear end, or shank 14, will abut the vine as the plow unit moves past said vine, thereby preventing said unit from cutting the vine while permitting the same to move in close to the row in between two adjacent vines.

The foregoing will, it is believed, suffice to impart a clear understanding of my invention, without further explanation.

Manifestly, the invention, as described, is susceptible of modification, without departing from the inventive concept, and right is herein reserved to such modifications as fall within the scope of the appended claim.

What I claim is:

A vineyard plow for attachment to the implement bar of a tractor to be drawn along a row of vines comprising a plow beam having front and rear ends, means on the front end of said beam for attaching the beam to said bar to swing laterally toward and from said vines, a plow unit on the rear end of said beam having a share oblique to the line of travel of the unit for causing said unit to plow obliquely forwardly toward the row of vines under resistance by the ground to forward travel of the unit, and a fender bar on one side of said beam for lengthwise wiping engagement with the vines successively to limit movement of said unit toward the vines, said plow unit being offset laterally of said plow beam on the side thereof opposite the fender bar to prevent the same from cutting the vines if the beam should strike said vines, and said fender bar being spaced below said beam and forwardly of said rear end of the beam with a rear end spaced laterally from said plow unit substantially opposite the point of the plow share to engage the vines close to the ground in a manner to fend said point away from the vines.

KERMIT L. THOMPSON.

REFERENCES CITED

The following references are of record in the file of this patent:

UNITED STATES PATENTS

| Number | Name | Date |
| --- | --- | --- |
| 963,525 | Daly | July 5, 1910 |
| 1,577,341 | Mettler | Mar. 16, 1926 |
| 2,185,634 | Jacobs et al. | Jan. 2, 1940 |